US010132618B2

(12) United States Patent
Isei et al.

(10) Patent No.: US 10,132,618 B2
(45) Date of Patent: Nov. 20, 2018

(54) METHOD AND DEVICE FOR INSPECTING CRANKSHAFT

(71) Applicant: NIPPON STEEL & SUMITOMO METAL CORPORATION, Tokyo (JP)

(72) Inventors: Yoshito Isei, Tokyo (JP); Toshiyuki Oyama, Tokyo (JP); Ryota Ohashi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/578,739

(22) PCT Filed: May 25, 2016

(86) PCT No.: PCT/JP2016/065436
§ 371 (c)(1),
(2) Date: Dec. 1, 2017

(87) PCT Pub. No.: WO2016/194728
PCT Pub. Date: Dec. 8, 2016

(65) Prior Publication Data
US 2018/0172436 A1    Jun. 21, 2018

(30) Foreign Application Priority Data
Jun. 1, 2015    (JP) ................. 2015-111233

(51) Int. Cl.
*G01B 11/24* (2006.01)
*G01B 11/25* (2006.01)
(Continued)

(52) U.S. Cl.
CPC .............. *G01B 11/24* (2013.01); *G01B 11/25* (2013.01); *G01M 11/081* (2013.01); *G01M 13/02* (2013.01); *G01M 99/00* (2013.01)

(58) Field of Classification Search
CPC ................ G01B 11/24; G01B 11/2408; G01B 11/2416; G01B 11/2425; G01B 11/25;
(Continued)

(56) References Cited

U.S. PATENT DOCUMENTS 4,576,482 A * 3/1986 Pryor ................. G01B 11/2433
209/538
4,854,162 A    8/1989 Yerace et al.
(Continued)

FOREIGN PATENT DOCUMENTS

EP    0 081 376 A2 *  6/1983
JP    63-32308          2/1988
(Continued)

*Primary Examiner* — Gordon J Stock, Jr.
(74) *Attorney, Agent, or Firm* — Clark & Brody

(57) ABSTRACT

The present invention provides a method for inspecting a crankshaft, which enables accurate detection of defects which occur partially in the crankshaft, such as underfills and dent flaws, by discriminating these defects from bending and torsion over an entire length of the crankshaft. The present invention includes steps of: acquiring three-dimensional point cloud data over an entire length of a measurement object region of a crankshaft S by an optical three-dimensional shape measurement device 1; dividing the acquired three-dimensional point cloud data to create a plurality of subregion three-dimensional point cloud data, each of the subregion three-dimensional point cloud data respectively corresponding to each of a plurality of subregions of the crankshaft along a direction parallel to the rotational center axis L of the crankshaft; translating and rotating each of the created subregion three-dimensional point cloud data to superpose each of the subregion three-dimensional point cloud data on a surface shape model of the crankshaft, such that a distance between each of the subregion three-dimensional point cloud data and the surface shape model becomes minimum; and detecting a partial
(Continued)

defect such as an underfill of the crankshaft based on a distance between each of the subregion three-dimensional point cloud data after being superposed and the surface shape model.

12 Claims, 11 Drawing Sheets

(51) Int. Cl.
    *G01M 13/02*     (2006.01)
    *G01M 11/08*     (2006.01)
    *G01M 99/00*     (2011.01)

(58) Field of Classification Search
    CPC .......... G01B 11/2513; G01B 11/2518; G01B 11/2522; G01B 11/2531; G01B 11/2536; G01B 11/254; G01B 9/02; G01M 13/02; G01M 11/08; G01M 11/081; G01M 99/00
    USPC .................................................. 356/600–613
    See application file for complete search history.

(56) References Cited

U.S. PATENT DOCUMENTS

| | | | | |
|---|---|---|---|---|
| 8,508,743 | B2* | 8/2013 | Keller | G01M 13/02 |
| | | | | 356/445 |
| 2012/0224180 | A1 | 9/2012 | Keller et al. | |
| 2013/0287511 | A1* | 10/2013 | Yoshimoto | B23B 49/04 |
| | | | | 408/109 |
| 2016/0223319 | A1* | 8/2016 | Munro | G01B 11/2518 |
| 2017/0052024 | A1* | 2/2017 | Reece, Jr. | G01B 11/002 |

FOREIGN PATENT DOCUMENTS

| | | | |
|---|---|---|---|
| JP | 8-101915 | | 4/1996 |
| JP | 2007-212357 A | * | 8/2007 |
| JP | 2009-168744 | | 7/2009 |
| JP | 2010-217083 | | 9/2010 |

* cited by examiner

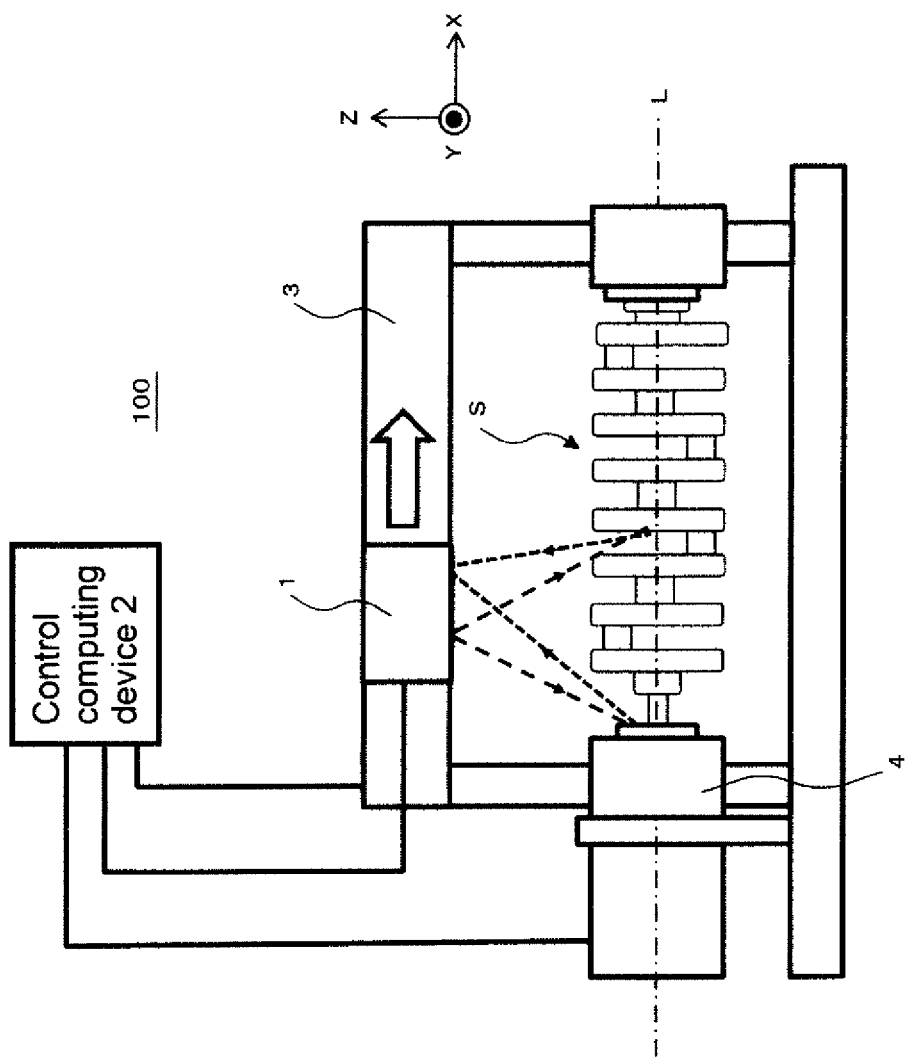
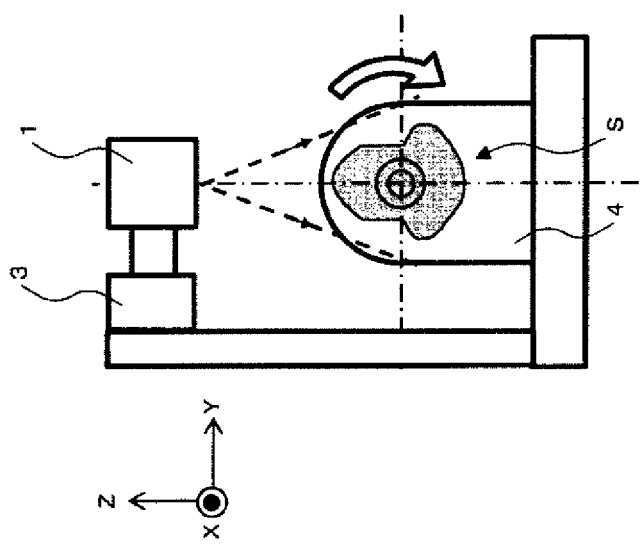
Figure 2B
Figure 2A

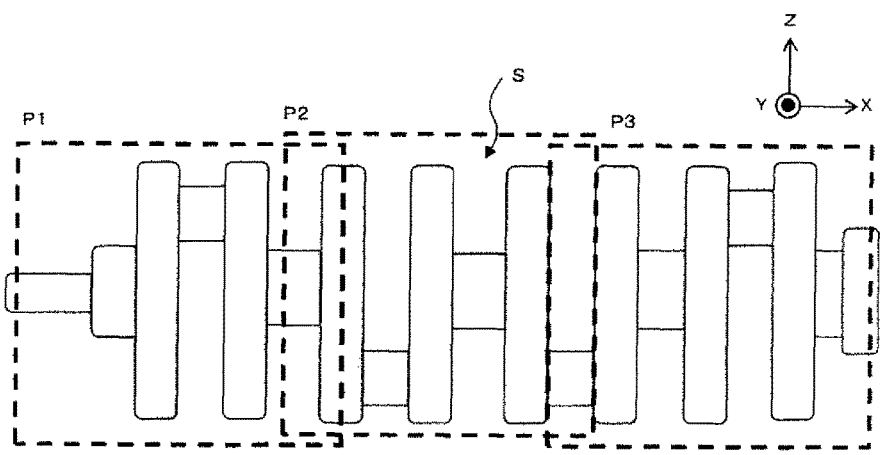

Figure 11A

|  | Elapsed Time | | | | | |
|---|---|---|---|---|---|---|
|  | 2 seconds | 4 seconds | 6 seconds | 8 seconds | 10 seconds | 12 seconds |
| Shape measurement device 1a | Measuring P1 | Moving | Measuring P2 | Moving | Measuring P3 | Moving |
| Shape measurement device 1c | Moving | Measuring P1 | Moving | Measuring P2 | Moving | Measuring P3 |
| Shape measurement device 1b | Measuring P2 | Moving | Measuring P3 | Moving | Measuring P1 | Moving |
| Shape measurement device 1d | Moving | Measuring P2 | Moving | Measuring P3 | Moving | Measuring P1 |

Figure 11B

METHOD AND DEVICE FOR INSPECTING CRANKSHAFT

TECHNICAL FIELD

The present invention relates to a method and device for inspecting a crankshaft for use in automobile engines and others in the production process thereof. In particular, the present invention relates to a method and device for inspecting a crankshaft, which enable accurate detection of defects which occur partially in the crankshaft, such as underfills and dent flaws, by discriminating these defects from bending and torsion over an entire length of the crankshaft.

BACKGROUND ART

A crankshaft is produced by pressing a heated starting material with upper and lower dies, and die-forging it to mold a forging including fins, thereafter removing fins and applying shot-blasting. A crankshaft thus produced in such production processes is subjected to machining so as to be properly assembled when assembled into an automobile engine, etc.

FIG. 1 is a diagram to schematically show an example of crankshaft (crankshaft for inline-four engine). FIG. 1A is a front view of the crankshaft S viewed from its rotational center axis L, and FIG. 1B is a side view of the crankshaft L viewed from a direction perpendicular to the rotational center axis L.

As shown in FIG. 1, the crankshaft S includes: a plurality of pins S1 for attaching a connecting rod (not shown), which are provided at positions of predetermined angles around the rotational center axis L; a plurality of journals S3; and a plurality of arms S2 each linking a pin S1 and a journal S3 which are adjacent to each other. The arm S2 may include a counterweight for achieving rotational balance. In the example shown in FIG. 1, every arm S2 includes a counterweight. The cross-sectional shape of the pin S1 is a circle centering on a position displaced from the rotational center axis L of the crankshaft S, and the cross-sectional shape of the journal S3 is a circle centering on the rotational center axis L of the crankshaft S. The cross-sectional shape of the arm S2 is a complicated shape which is bilaterally symmetric or asymmetric.

As described above, due to a complicated shape of a crankshaft, and due to variations in the starting material size, unevenness of the starting material temperature, and variations in forging operation, there may occur a defect called underfill in which the starting material is not filled to each end of the die upon forging, and may occur bending and torsion of the crankshaft over its entire length. Moreover, there may occur dent flaws caused by contact with conveying equipment, etc. during handling of the crankshaft. For this reason, in the production line of a crankshaft, before subjecting it to machining, an actual shape of the crankshaft is inspected by comparison with a criterial shape to make pass/fail judgment.

The criteria for pass/fail judgment of crankshaft includes:
(a) bending and torsion of the crankshaft is within a predetermined tolerance range, and
(b) there is neither underfill nor dent flaw having a depth that disables to ensure a sufficient machining stock.

The reason why the condition that bending and torsion of the crankshaft is within a predetermined tolerance range is one of the pass/fail judgment criteria as described in item (a) above is that if the bending of the crankshaft is large, or the torsion thereof is large so that the placing position of the pin is significantly deviated from the predetermined angle, it becomes difficult to achieve dimensional accuracy and weight balance as a final product regardless of what kind of processing is applied in subsequent processes.

Further, the reason why the absence of underfill and dent flaw, each having a depth that disables to ensure a sufficient machining stock, is one of the pass/fail judgement criteria, as described in item (b) above is that if the machining stock is too small, there is little margin for machining in subsequent processes, and it becomes difficult to achieve dimensional accuracy and weight balance as a final product.

A conventional method for inspecting a crankshaft is performed in such a way that each plate gauge which is formed to correspond to criterial shapes of a pin and an arm is put onto the pin and the arm of the crankshaft to be inspected, and a gap between each plate gauge and the pin and arm is measured with a scale to judge that the crankshaft has passed when a size of the gap (shape error) is within a tolerance range. This method has a problem in that since the method is performed manually by an operator by using a plate gauge which is formed to correspond to criterial shapes of the pin and arm, not only personal difference occurs in inspection accuracy, but also inspection requires a significant amount of time. For this reason, various inspection methods of a crankshaft have been proposed to automatically perform accurate inspection.

Patent Literature 1 proposes a method of calculating a longitudinal direction size of a predetermined portion of a crankshaft based on a detection result by a one-dimensional image sensor, in which the one-dimensional image sensor is disposed on one side of the crankshaft such that the arrangement direction of its light receiving elements corresponds to a direction perpendicular to the longitudinal direction of the crankshaft, and a light source is disposed on the other side of the crankshaft, and in which the one-dimensional image sensor is moved along the longitudinal direction of the crankshaft.

Since the method according to Patent Literature 1 calculates a longitudinal direction size of a predetermined portion of a crankshaft, bending may be calculable; however, it is not possible to detect a partial defect such as an underfill, and torsion.

Patent Literature 2 proposes a method of calculating angular positions of a pin and a counterweight of a crankshaft by measuring a distance to the crankshaft surface using a laser range meter while the crankshaft is rotated around the rotational center axis with each end thereof being secured with a chuck.

Patent Literature 3 proposes a method of detecting an underfill of a counterweight by measuring a distance to a counterweight of the crankshaft by a two-dimensional laser range meter and comparing with a criterial shape.

The method according to Patent Literature 2 can detect torsion of a crankshaft, and the method according to Patent Literature 3 can detect underfills. However, since these methods use a one-dimensional laser range meter (Patent Literature 2) and a two-dimensional laser range meter (Patent Literature 3), it takes a significant amount of time to measure a distance along an entire length of a crankshaft. Therefore, it is difficult to perform inspection over the entire length of a crankshaft in the production process of crankshaft, and it requires a sampling inspection, or an inspection limited to a minimum number of areas of the crankshaft where inspection is necessary.

Patent Literature 4 proposes a method for inspecting a crankshaft, in which a surface shape of an entire crankshaft is measured by a three-dimensional shape measurement device, whereby inspection is performed based on whether or not a three-dimensional model for judgment satisfies a predetermined criterion, where the three-dimensional model for judgement is obtained by supplementing portions where measurement is impossible with a three-dimensional model for supplementation.

When judging whether or not the predetermined criterion is satisfied by the method according to Patent Literature 4, it is conceivable, for example, to match three-dimensional point cloud data (three-dimensional model for judgment) basically obtained by a three-dimensional shape measurement device with a surface shape model of the crankshaft created from CAD data, etc. based on the design specification of the crankshaft, and evaluate a deviation therebetween. However, it is difficult to accurately discriminate whether the deviation has occurred caused by a partial defect such as an underfill, or caused by bending over an entire length of the crankshaft.

CITATION LIST

Patent Literature

Patent Literature 1: JP S59-184814 A
Patent Literature 2: JP H6-265334 A
Patent Literature 3: JP H10-62144 A
Patent Literature 4: JP 2007-212357 A

SUMMARY OF INVENTION

Technical Problem

The present invention has been made to solve the problems of conventional art as described above, and has its objective to provide a method and device for inspecting a crankshaft, which can accurately detect defects which occur partially in a crankshaft, such as underfills and dent flaws, by discriminating these partial defects from bending and torsion over an entire length of the crankshaft.

Solution to Problem

In order to solve the problems as described above, the present inventors have conducted diligent research. As a result, the present inventors have found that if three-dimensional point cloud data (aggregate of three-dimensional coordinates) of a crankshaft surface obtained by a three-dimensional shape measurement device is divided to create a plurality of subregion three-dimensional point cloud data in which each of the subregion three-dimensional point cloud data respectively corresponds to each of a plurality of subregions of the crankshaft, and each of the three-dimensional point cloud data is matched with a surface shape model created based on a design specifications, then it becomes possible to discriminate defects that occur partially in a crankshaft, such as underfills and dent flaws, from bending and torsion over an entire length of the crankshaft, thereby to accurately detect these partial defects. Thus, the present inventors have completed the present invention.

Thus, in order to solve the problems as described above, the present invention provides a method for inspecting a crankshaft, which includes the following first to fifth steps.

(1) First step: disposing an optical three-dimensional shape measurement device to face a crankshaft in a direction perpendicular to a rotational center axis of the crankshaft, in which the optical three-dimensional shape measurement device is configured to measure a three-dimensional shape of a measurement object by projecting and receiving light to and from the measurement object.

(2) Second step: measuring a surface shape of the crankshaft by the three-dimensional shape measurement device disposed in the first step to acquire three-dimensional point cloud data of a surface of the crankshaft over an entire length of a measurement object region of the crankshaft.

(3) Third step: dividing the three-dimensional point cloud data acquired in the second step to create a plurality of subregion three-dimensional point cloud data, each of the subregion three-dimensional point cloud data respectively corresponding to each of a plurality of subregions of the crankshaft along a direction parallel to the rotational center axis of the crankshaft.

(4) Fourth step: translating and rotating each of the subregion three-dimensional point cloud data created in the third step to superpose each of the subregion three-dimensional point cloud data on a surface shape model of the crankshaft prepared in advance based on a design specification of the crankshaft, such that a distance between each of the subregion three-dimensional point cloud data and the surface shape model becomes minimum.

(5) Fifth step: calculating a distance between each of the subregion three-dimensional point cloud data after being superposed in the fourth step and the surface shape model, and detecting a partial defect such as an underfill of the crankshaft based on the distance calculated.

According to the present invention, performing the first step and the second step enables three-dimensional point cloud data of a crankshaft surface over an entire length of a measurement object region to be obtained (for example, a region spanning over arms located at each end of the crankshaft).

Then, performing the third step and the fourth step causes each of a plurality of divided subregion three-dimensional point cloud data to be superposed on a surface shape model individually (each of the subregion three-dimensional point cloud data is translated and rotated such that a distance between each of the subregion three-dimensional point cloud data and the surface shape model becomes minimum). For this reason, compared with a case where the three-dimensional point cloud data is superposed without being divided (undivided three-dimensional point cloud data is translated and rotated such that the distance between the undivided three-dimensional point cloud data and the surface shape model becomes minimum), the subregion three-dimensional point cloud data can be superposed on the surface shape model with influences of the bending and torsion over the entire length of the crankshaft being reduced.

Thus, in the fifth step, by calculating the distance between each of the subregion three-dimensional point cloud data after being superposed in the fourth step and the surface shape model, based on the calculated distance, it is possible to discriminate a partial defect such as an underfill of the crankshaft from bending and torsion over the entire length of the crankshaft to accurately detect the partial defect.

It is noted that "dividing three-dimensional point cloud data, each of the subregion three-dimensional point cloud data respectively corresponding to each of a plurality of subregions of the crankshaft" in the present invention includes both cases where adjacent subregions of a crankshaft have and do not have an overlapped portion along a direction parallel to the rotational center axis of the crankshaft. In either case, if a plurality of divided subregions are combined, thus combined region corresponds to the measurement object region of the crankshaft from which three-dimensional point cloud data have been acquired.

Moreover, "a distance between each of subregion three-dimensional point cloud data and a surface shape model of a crankshaft becomes minimum" in the present invention means that a total sum of distances between each data point constituting each of the subregion three-dimensional point cloud data and the surface shape model becomes minimum, or a total sum of squares of the distances becomes minimum.

A larger measurement field of view of the three-dimensional shape measurement device will result in a larger region of the crankshaft where the surface shape can be measured at one time, and is therefore preferable in terms of reduction of measurement time. However, in general, measurement resolution will decline as the measurement field of view of the three-dimensional shape measurement device is increased. On the other hand, installing a plurality of three-dimensional shape measurement devices having a high measurement resolution (a small measurement field of view) in a direction parallel to the rotational center axis of the crankshaft will cause increase in cost and degradation of maintainability.

Thus, preferably, in the present invention, in the second step, measurement of the surface shape of the crankshaft by the three-dimensional shape measurement device and relative movement of the three-dimensional shape measurement device in a direction parallel to the rotational center axis of the crankshaft are alternately repeated.

As in the above-described preferred method, repeating the measurement by the three-dimensional shape measurement device and the relative movement of the three-dimensional shape measurement device will have advantages of improving measurement resolution as well as mitigating increase in cost and decline of maintainability.

Preferably, the method according to the present invention further includes a sixth step of evaluating bending and torsion of the crankshaft based on a translating distance and a rotational angle when each of the subregion three-dimensional point cloud data is translated and rotated in the fourth step.

According to the above-described preferred method, it is possible not only to detect a partial defect such as an underfill of a crankshaft, but also to evaluate bending and torsion of a crankshaft. Specifically, it is possible to evaluate bending by adding up translating distances of each of the subregion three-dimensional point cloud data, and to evaluate torsion by adding up rotational angles of each of the subregion three-dimensional point cloud data.

Preferably, in the present invention, in the third step, when a defect detection accuracy required in the fifth step is $\pm\Delta e$ [mm], a size $Lp$ [mm] of the subregion of the crankshaft, which is to be divided, in a direction parallel to the rotational center axis of the crankshaft is determined so as to satisfy the following Formula (1):

$$Lp \leq 2L \cdot \Delta e / (\Delta b + \Delta a \cdot R) \tag{1}$$

where, in the above Formula (1), L [mm] refers to an entire length in a design specification of the crankshaft; R [mm] refers to a maximum radius in a design specification of the crankshaft; $\Delta a$ [rad] refers to an assumed torsion angle over an entire length of the crankshaft; and $\Delta b$ [mm] refers to an assumed bending over an entire length of the crankshaft.

When an assumed bending over the entire length of the crankshaft is $\Delta b$ [mm], and the entire length in the design specification of the crankshaft is L [mm], it can be supposed that a bending per size $Lp$ [mm] is $\Delta b \cdot Lp/L$ [mm]. Further, when an assumed torsion angle over the entire length of the crankshaft is $\Delta a$ [rad], the entire length in the design specification of the crankshaft is L [mm], and a maximum radius in the design specification of the crankshaft is R [mm], it can be supposed that torsion per size $Lp$ [mm] is $\Delta a \cdot R \cdot Lp/L$ [mm]. For this reason, it is considered that satisfying the following Formula (2) enables detection of a partial defect such as an underfill at a detection accuracy of $\pm\Delta e$ [mm].

$$\Delta b \cdot Lp/L + \Delta a \cdot R \cdot Lp/L \leq 2 \cdot \Delta e \tag{2}$$

Modifying Formula (2) will result in Formula (1) described above. Therefore, determining the size $Lp$ of a divided subregion (size in a direction parallel to the rotational center axis of the crankshaft) so as to satisfy Formula (1) will make it possible to detect a partial defect such as an underfill at a detection accuracy of $\pm\Delta e$ [mm].

It is noted that in the above-described preferred method, it is possible to determine an assumed torsion angle $\Delta a$ and an assumed bending $\Delta b$ based on past production results of a crankshaft of the same kind of the measurement object, the requirement specification of delivery destination of the production, and the like (for example, by using maximum values and average values of the torsion angle and the bending in past production results).

The term "torsion angle" in the above-described preferred method means an angle by which an arm provided on one end of a crankshaft is rotated with respect to CAD data of an arm based on a design specification when the arm provided on the other end is aligned to the CAD data of the arm.

The term "bending" in the above-described preferred method means a distance by which one end of a crankshaft is displaced in a direction perpendicular to a rotational center axis with respect to one end of CAD data of a crankshaft based on a design specification when the other end of the crankshaft is aligned to the other end of the CAD data of the crankshaft.

Further, "maximum radius in a design specification of a crankshaft" means a maximum distance from a rotational center axis of a crankshaft to a crankshaft surface (specifically, an arm surface) in CAD data based on a design specification.

Here, bending and torsion of a crankshaft predominantly takes place at journals or pins. Thus, preferably, in the third step, the subregion of the crankshaft is determined such that both ends of the subregion, which is to be divided, in a direction parallel to the rotational center axis of the crankshaft are located at adjacent journals of the crankshaft, adjacent pins of the crankshaft, or a journal and a pin adjacent to each other of the crankshaft.

It is noted that when the size $Lp$ of the subregion, which is to be divided, is determined so as to satisfy Formula (1) described above, if $Lp$ is made too small, an accuracy of superposition deteriorates when superposing the subregion three-dimensional point cloud data on the surface shape model. For this reason, it is not true that $Lp$ is preferably as small as possible. It is preferable to determine $Lp$ such that $Lp$ is equal to or higher than a minimum value among a distance between adjacent journals, a distance between adjacent pins, and a distance between a journal and a pin which are adjacent to each other.

According to the above-described preferred method, since dividing into subregions is performed at positions where bending and torsion are likely to take place, it is possible to superpose the subregion three-dimensional point cloud data on the surface shape model in a state where influences of bending and torsion are effectively reduced. For this reason, it is possible to discriminate partial defects such as underfills of a crankshaft from bending and torsion over the entire length of the crankshaft, thereby to accurately detect such partial defects.

In the fifth step of the present invention, calculating distances between each of the subregion three-dimensional point cloud data after being superposed in the fourth step and the surface shape model is performed. In other words, a large number of numerical information which consists of three-dimensional coordinates of each data point constituting the subregion three-dimensional point cloud data, and distances associated with each data point. It is not easy to detect a partial defect such as an underfill of the crankshaft by using these large number of numerical information as they are.

Thus, preferably, in the present invention, in the fifth step, a two-dimensional gradation image is created, in which a pixel constituting the two-dimensional gradation image has a density corresponding to a distance between each of the subregion three-dimensional point cloud data after being superposed in the fourth step and the surface shape model, wherein the two-dimensional gradation image is a projection of each of the subregion three-dimensional point cloud data after being superposed in the fourth step to a plane perpendicular to a facing direction between the three-dimensional shape measurement device and the crankshaft, and a partial defect of the crankshaft is detected based on a feature quantity obtained by subjecting the two-dimensional gradation image to predetermined image processing.

According to the above-described preferred method, since the large number of numerical information is transformed into a two-dimensional gradation image having a pixel density according to a distance between the subregion three-dimensional point cloud data after being superposed in the fourth step and the surface shape model, it is possible to subject the two-dimensional gradation image to image processing similar to that for a conventional general inspection method. It is possible to automatically and easily detect a partial defect such as an underfill, for example, by extracting a pixel region having a density higher than a predetermined threshold (a pixel region having a large distance between superposed subregion three-dimensional point cloud data and the surface shape model), and using a feature quantity calculated from an area, a density and the like of the extracted pixel region.

Preferably, the method according to the present invention further includes a seventh step of: creating a two-dimensional image in which a pixel constituting the two-dimensional image has a density or a color corresponding to a distance between each of the subregion three-dimensional point cloud data after being superposed in the fourth step and the surface shape model, wherein the two-dimensional image is a projection of each of the subregion three-dimensional point cloud data after being superposed in the fourth step to a plane perpendicular to a facing direction between the three-dimensional shape measurement device and the crankshaft; and displaying the two-dimensional image.

According to the above-described preferred method, a two-dimensional image is created and displayed, in which a pixel region corresponding to a larger distance between each of the superposed subregion three-dimensional point cloud data and the surface shape model has a density or a color different from that of surrounding pixel regions. As a result, it is possible to easily detect a pixel region corresponding to a large distance between each of the superposed subregion three-dimensional point cloud data and the surface shape model, that is, a partial defect such as an underfill, by an operator visually recognizing the two-dimensional image.

In order to solve the above-described problems, the present invention also provides a device for inspecting a crankshaft, which includes: an optical three-dimensional shape measurement device which is disposed to face a crankshaft in a direction perpendicular to a rotational center axis of the crankshaft, and which is configured to measure a three-dimensional shape of a measurement object by projecting and receiving light to and from the measurement object; and a control computing device configured to control an operation of the three-dimensional shape measurement device and executing predetermined computing on a result measured by the three-dimensional shape measurement device, in which: a surface shape model of the crankshaft prepared based on a design specification of the crankshaft is stored in advance in the control computing device; three-dimensional point cloud data of a surface of the crankshaft over the entire length of a measurement object region of the crankshaft acquired by the three-dimensional shape measurement device measuring the surface shape of the crankshaft is input to the control computing device; and the control computing device is configured to execute steps of: dividing the three-dimensional point cloud data which is input, to create a plurality of subregion three-dimensional point cloud data, each of the subregion three-dimensional point cloud data respectively corresponding to each of a plurality of subregions of the crankshaft along a direction parallel to the rotational center axis of the crankshaft; translating and rotating each of the subregion three-dimensional point cloud data to superpose each of the subregion three-dimensional point cloud data on the surface shape model such that a distance between each of the subregion three-dimensional point cloud data created and the surface shape model stored becomes minimum; and calculating a distance between each of the subregion three-dimensional point cloud data after being superposed and the surface shape model, and detecting a partial defect such as an underfill of the crankshaft based on the distance calculated.

Preferably, the device for inspecting a crankshaft according to the present invention further includes a moving mechanism whose operation is controlled by the control computing device and which is configured to relatively move the three-dimensional shape measurement device in a direction parallel to the rotational center axis of the crankshaft, in which the control computing device is configured to control the operation of the three-dimensional shape measurement device and the moving mechanism such that measurement of the surface shape of the crankshaft by the three-dimensional shape measurement device, and relative movement of the three-dimensional shape measurement device in a direction parallel to the rotational center axis of the crankshaft by the moving mechanism are alternately repeated.

As the three-dimensional shape measurement device, a three-dimensional shape measurement device of a pattern projection type can be used.

As a three-dimensional shape measurement device of pattern projection type, there is known a device which can measure a surface shape of several hundreds mm square in a time period of about one to two seconds, at a measurement resolution of about 0.1 mm. Since a length of crankshaft is about 350 mm to 600 mm, as in the above-described preferred device, performing measurement by relatively moving the three-dimensional shape measurement device of pattern projection type in a direction parallel to the rotational center axis of the crankshaft will make it possible to accurately measure the entire length by repeating measurement two to three times, and provide an advantage that time required for measurement may be as short as 10 seconds or less.

Preferably, the device for inspecting a crankshaft according to the present invention includes four three-dimensional shape measurement devices disposed at a pitch of 90° around the rotational center axis of the crankshaft, in which: the moving mechanism can separately move the four three-dimensional shape measurement devices in a direction parallel to the rotational center axis of the crankshaft; and the control computing device can separately control timing of measuring the surface shape of the crankshaft by the four three-dimensional shape measurement devices and timing of moving the four three-dimensional shape measurement devices by the moving mechanism.

According to the above-described preferred device, since four three-dimensional shape measurement devices are disposed at a pitch of 90° around the rotational center axis of the crankshaft, it is possible to measure the shape of the entire length and the entire circumference of the measurement object region of the crankshaft without relatively rotating the crankshaft in the circumferential direction, and thus to reduce the measurement time. Moreover, according to the above-described preferred device, a moving mechanism can move the four three-dimensional shape measurement devices separately in a direction parallel to the rotational center axis of the crankshaft, and a control computing device can separately control the timing of measuring the surface shape of the crankshaft by the four three-dimensional shape measurement devices and the timing of moving the four three-dimensional shape measurement devices by the moving mechanism. For this reason, it is possible to perform positional control of the three-dimensional shape measurement device and timing control of measurement and movement of the three-dimensional shape measurement device, which can avoid a situation in which projected light of any of the three-dimensional shape measurement devices comes into the measurement field of view of another three-dimensional shape measurement device different from the concerned three-dimensional shape measurement device during measurement, thereby disabling the measurement by the concerned another three-dimensional shape measurement device.

More specifically and preferably, the control computing device is configured to control the operation of the moving mechanism and the four three-dimensional shape measurement devices such that while any one pair of three-dimensional shape measurement devices disposed in a direction opposite to each other among the four three-dimensional shape measurement devices are measuring the surface shape of the crankshaft, any other pair of three-dimensional shape measurement devices disposed in a direction opposite to each other are moved without performing measurement, and such that projected light of one three-dimensional shape measurement device constituting the pair of three-dimensional shape measurement devices measuring the surface shape of the crankshaft does not enter a measurement field of view of the other three-dimensional shape measurement device.

According to the above-described preferred device, while any one pair of three-dimensional shape measurement devices disposed in a direction opposite to each other measures the surface shape of the crankshaft, any other pair of three-dimensional shape measurement devices disposed in a direction opposite to each other will move without performing measurement. For this reason, projected light from one pair of the three-dimensional shape measurement devices which are measuring the surface shape of the crankshaft will not influence the other pair of the three-dimensional shape measurement devices which are moving without performing measurement. Moreover, according to the above-described preferred device, since control is performed such that projected light of one three-dimensional shape measurement device constituting one pair of three-dimensional shape measurement devices which are measuring the surface shape will not enter the measurement field of view of the other pair of three-dimensional shape measurement devices, it is possible to avoid a situation in which the other pair of three-dimensional shape measurement devices becomes unable to perform measurement.

Advantageous Effects of Invention

According to the present invention, it is possible to discriminate defects that partially occur in a crankshaft such as underfills and dent flaws from bending and torsion over the entire length of the crankshaft and to accurately detect the defects that partially occur in a crankshaft.

BRIEF DESCRIPTION OF DRAWINGS

FIG. 2 is a diagram showing a schematic configuration of an inspection device of a crankshaft according to a first embodiment of the present invention.

FIG. 11 is a diagram showing an example of results of evaluation of surface-shape measurement time of a crankshaft by an inspection device according to the second embodiment of the present invention.

DESCRIPTION OF EMBODIMENTS

Figures 1A, 1B:
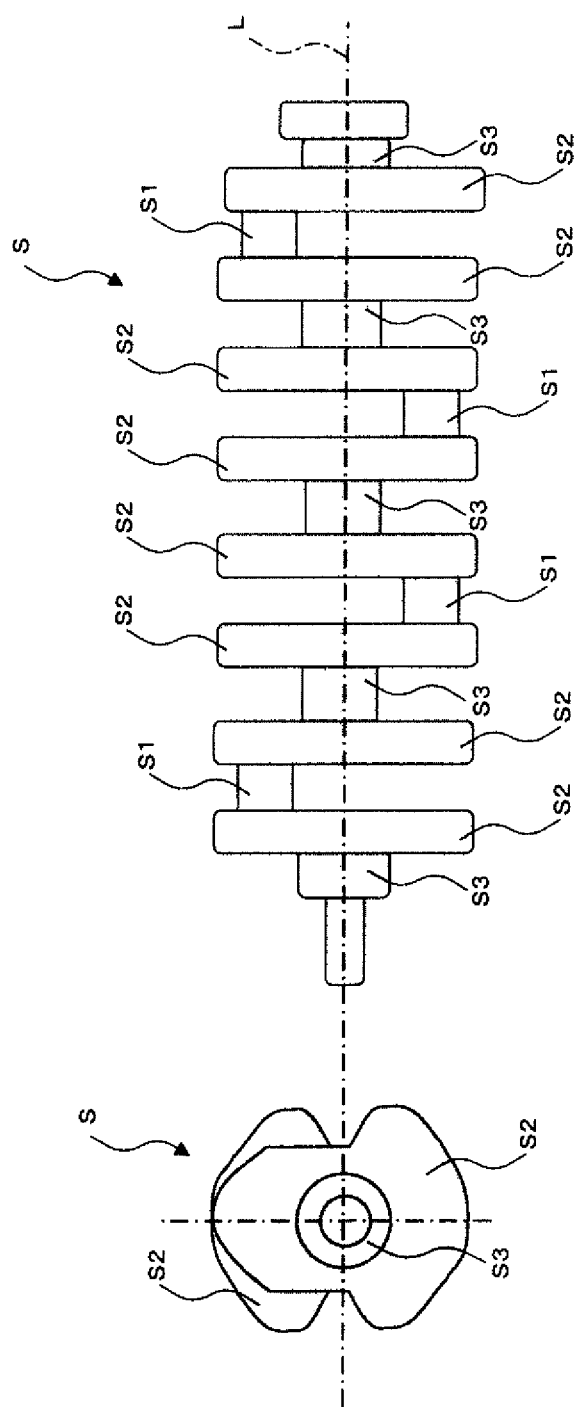
FIG. 1 is a diagram schematically showing one example of crankshaft (a crankshaft for an inline-four engine).

Hereinafter, embodiments of the present invention will be described appropriately referring to the appended drawings.

First Embodiment

FIG. 2 is a diagram showing a schematic configuration of an inspection device of a crankshaft (hereinafter, referred to simply as an "inspection device") according to a first embodiment of the present invention. FIG. 2A is a front view of a crankshaft S viewed from a direction of a rotational center axis L of the crankshaft S. FIG. 2B is a side view seen from a direction perpendicular to the rotational center axis L. In FIG. 2A, the crankshaft S is shown in a transparent view, and a control computing device 2 is omitted from illustration.

As shown in FIG. 2, an inspection device 100 according to the present embodiment includes an optical three-dimensional shape measurement device 1, a control computing device 2, a moving mechanism 3, and a rotating device 4.

The three-dimensional shape measurement device 1 is a device which measures a three-dimensional shape of a measurement object (a crankshaft S in the present invention) by projecting and receiving light to and from the measurement object. Specifically, the three-dimensional shape measurement device 1 projects light to the crankshaft S and receives light reflected at the surface of the crankshaft S, to measure a surface shape of the crankshaft S. The three-dimensional shape measurement device 1 is disposed to face the crankshaft S in a direction perpendicular to a rotational center axis L of the crankshaft S (a vertical direction which is the Z direction shown in FIG. 2).

As the three-dimensional shape measurement device 1 of the present embodiment, a three-dimensional shape measurement device of pattern projection type is used. A three-dimensional shape measurement device of patter projection type generally includes a pattern projector of liquid crystal type or DMD (digital mirror device) type, and an imaging device. The three-dimensional shape measurement device of patter projection type measures a surface shape of a measurement object by using a principle of triangulation in which a fringe pattern is projected from the pattern projector to a measurement object, and an image of the measurement object to which the fringe pattern has been projected is taken by the imaging device to analyze deformation of the fringe pattern. Preferably used is a three-dimensional shape measurement device (for example, SD-3K supplied by Shape-Drive GmbH) utilizing a spatial coding method, whereby a fringe pattern in which a bright part and a dark part are alternately arranged at an arbitrary spacing is projected to binary-encode a space.

As the three-dimensional shape measurement device 1 of the present embodiment, a three-dimensional shape measurement device of pattern projection type is used in which a measurement field of view is 200 mm (in a direction parallel to the rotational center axis L of the crankshaft S, which is the X direction shown in FIG. 2)×100 mm (in a direction perpendicular to the X direction and the Z direction, which is the Y direction shown in FIG. 2)×80 mm (in the Z direction shown in FIG. 2) when the distance to the measurement object is 400 mm. The measurement resolution in the X direction and the Y direction is 0.1 mm, and the measurement resolution in the Z direction is 0.02 mm. The measurement time is within 2 seconds.

The control computing device 2 controls an operation of the three-dimensional shape measurement device 1, the moving mechanism 3 and the rotating device 4, and executes predetermined computation on measurement results by the three-dimensional shape measurement device 1. The control computing device 2 includes, for example, a personal computer in which a program or an application is installed, the program and the application executing the above-described control and computation.

Further, in the control computing device 2, a surface shape model of the crankshaft S prepared based on a design specification of the crankshaft S is stored in advance. Specifically, three-dimensional CAD data based on the design specification is input to the control computing device 2, and the control computing device 2 transforms the input CAD data into a surface shape model composed of a triangular mesh. Then, the surface shape model is stored in the control computing device 2. Since the surface shape model can be prepared and stored for each kind of the crankshaft S, it is not necessary to prepare the surface shape model for each inspection when successively inspecting the same kind of crankshafts S.

The moving mechanism 3 relatively moves the three-dimensional shape measurement device 1 in a direction (the X direction shown in FIG. 2) parallel to the rotational center axis L of the crankshaft S. As the moving mechanism 3, for example, a single-axis stage can be used. The single-axis stage to be used as the moving mechanism 3 is preferably capable of positioning or indicating its location at a resolution of 0.1 mm or less. It is noted that although the moving mechanism 3 of the present embodiment is a mechanism to move the three-dimensional shape measurement device 1, but is not limited thereto, the moving mechanism 3 may be a mechanism configured to move the crankshaft S in the X direction.

The rotating device 4 secures each end of the crankshaft S by chucking, and rotates, thereby causing the crankshaft S to rotate around the rotational center axis L. The rotating device 4 is preferably capable of rotationally positioning or indicating rotational positions at a pitch of 0.1° or less, such as one which is rotated by a stepping motor or one which is provided with a rotary encoder at the rotational center, such that the rotational angle of the crankshaft S can be indicated.

Hereinafter, an inspection method of a crankshaft S by using the inspection device 100 having the above-described configuration will be described.

An inspection method according to the present embodiment is characterized by including first to fifth steps. Hereinafter, each step will be successively described.

(1) First Step

In the first step, the three-dimensional shape measurement device 1 is disposed to face the crankshaft S in a direction (Z direction) perpendicular to the rotational center axis L of the crankshaft S. Specifically, the three-dimensional shape measurement device 1 is disposed to face the crankshaft S in the Z direction by securing the crankshaft S to the rotating device 4 such that the rotational center axis L thereof is horizontal.

(2) Second Step

In the second step, three-dimensional point cloud data of the surface of the crankshaft S over the entire length of a measurement object region of the crankshaft S is acquired by measuring the surface shape of the crankshaft S with the three-dimensional shape measurement device 1. Specifically, the control computing device 2 controls an operation of the three-dimensional shape measurement device 1 and the moving mechanism 3 such that measurement of the surface shape of the crankshaft S by the three-dimensional shape measurement device 1 and movement of the three-dimensional shape measurement device 1 in the X direction by the moving mechanism 3 are alternately repeated. That is, when measurement of the surface shape of the crankshaft S in the above-described one measurement field of view is finished by the three-dimensional shape measurement device 1, the three-dimensional shape measurement device 1 is moved in the X direction by the moving mechanism 3, and measures the surface shape of the crankshaft S in the next measurement field of view. A combined region of these plurality of measurement fields of view extends over the entire length of the measurement object region of the crankshaft S. Since the length of the crankshaft S is about 350 to 600 mm for a 3- to 6-cylinder engine, and the field of view of the three-dimensional shape measurement device 1 in the X direction is 200 mm, it is possible to acquire three-dimensional point cloud data of the surface of the crankshaft S over the entire length of the measurement object region of the crankshaft S by repeating measurement two to three times.

The three-dimensional point cloud data of the surface of the crankshaft S over the entire length of the measurement object region of the crankshaft S, which has been acquired as described above, is input into the control computing device 2 via Ethernet (registered trademark) or the like and is stored.

(3) Third Step

In the third step, the control computing device 2 divides the three-dimensional point cloud data which has been input and stored as described above, to create a plurality of subregion three-dimensional point cloud data, in which each of the plurality of subregion three-dimensional point cloud data corresponds to each of a plurality of subregions of the crankshaft S along a direction (X direction) parallel to the rotational center axis L. The method for determining the subregion will be described later.

It is noted that the stored three-dimensional point cloud data is subjected as needed to removal of isolated data points for reducing noise, and to thinning of data points into a predetermined pitch (for example, thinning of the X direction and Y direction into 0.5 mm pitch) for increasing processing speed. Furthermore, as needed, the three-dimensional point cloud data after thinning is subjected to smoothing processing for reducing noise. As needed, after application of these signal processing, a plurality of subregion three-dimensional point cloud data is created.

(4) Fourth Step

In the fourth step, the control computing device 2 causes, for each of created subregion three-dimensional point cloud data, each of the subregion three-dimensional point cloud data to be translated and rotated respectively so as to be superposed on the surface shape model such that a distance between each of the subregion three-dimensional point cloud data and the surface shape model stored as described above becomes minimum (a total sum of distances between each data point constituting the subregion three-dimensional point cloud data and the surface shape model becomes minimum, or a total sum of squares of the distances becomes minimum). In this occasion, as with the subregion three-dimensional point cloud data, the surface shape model is also divided to create each of divided surface shape model respectively corresponding to each of a plurality of subregions in the X direction as well. Then, each of the subregion three-dimensional point cloud data is superposed on each of the divided surface shape model of a region corresponding to each subregion three-dimensional point cloud data.

(5) Fifth Step

In the fifth step, the control computing device 2 calculates the distance between each of the subregion three-dimensional point cloud data after being superposed as described above and the surface shape model, and detects a partial defect such as an underfill of the crankshaft S based on the calculated distance. Specific detection method will be described later.

It is noted that the computation in the third step to the fifth step of the control computing device 2 as described so far can be executed by using commercial three-dimensional analysis software (for example, HALCON 12 manufactured by MVTec Software GmbH).

By executing the first step to the fifth step described above, inspection on a predetermined portion in the circumferential direction of the crankshaft S is finished. Next, the rotating device 4 is driven by the control computing device 2, and the crankshaft S is rotated (for example, rotated by 90°) around the rotational center axis L by the rotating device 4 and stopped. Then, by executing the above-described second to fifth steps on other portions in the circumferential direction of the crankshaft S, the inspection on another portion is finished. By repeating the above-described operations, inspection of the entire length and the entire circumference of measurement object region of the crankshaft S is performed.

It is noted that in the second step, by rotating the crankshaft S with the rotating device 4, it is also possible to acquire in advance the three-dimensional point cloud data of the surface of the crankshaft S over the entire length and the entire circumference of the measurement object region of the crankshaft S and thereafter to successively execute the third to the fifth steps.

According to the inspection method according to the present embodiment, the three-dimensional point cloud data of the surface of the crankshaft S over the entire length of the measurement object region of the crankshaft S is acquired by executing the first and second steps.

Then, by executing the third and fourth steps, a plurality of divided subregion three-dimensional point cloud data is individually superposed on the surface shape model (each of the subregion three-dimensional point cloud data is translated and rotated such that a distance between each of the subregion three-dimensional point cloud data and the surface shape model becomes minimum). For this reason, compared with a case in which the three-dimensional point cloud data is directly superposed without being divided (the three-dimensional point cloud data is translated and rotated such that the distance to the surface shape model becomes minimum), the three-dimensional point cloud data will be superposed on the surface shape model with influences of bending and torsion over the entire length of the crankshaft S being reduced.

Thus, in the fifth step, it is possible to calculate the distance between the subregion three-dimensional point cloud data after being superposed in the fourth step and the surface shape model, and to accurately detect a partial defect such as an underfill of the crankshaft S based on the calculated distance, discriminating such partial defects from bending and torsion over the entire length of the crankshaft.

Hereinafter, the above-described contents will be described more specifically referring to the drawings.

Figure 3A:
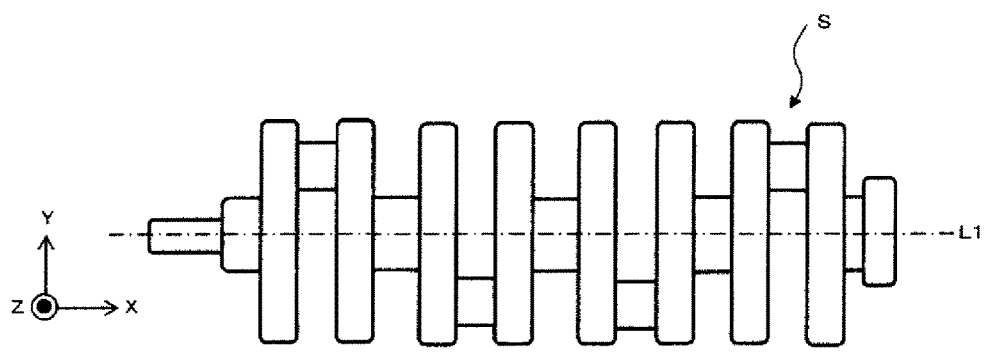
FIG. 3 is a schematic diagram to explain a situation in which three-dimensional point cloud data is superposed on a surface shape model without being divided, for a crankshaft having neither bending nor torsion.
Figure 3B:
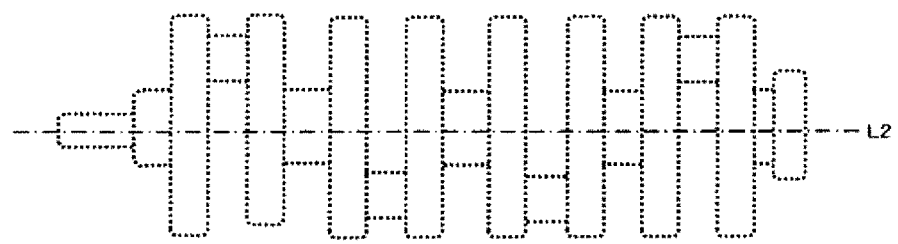
Figure 3C:
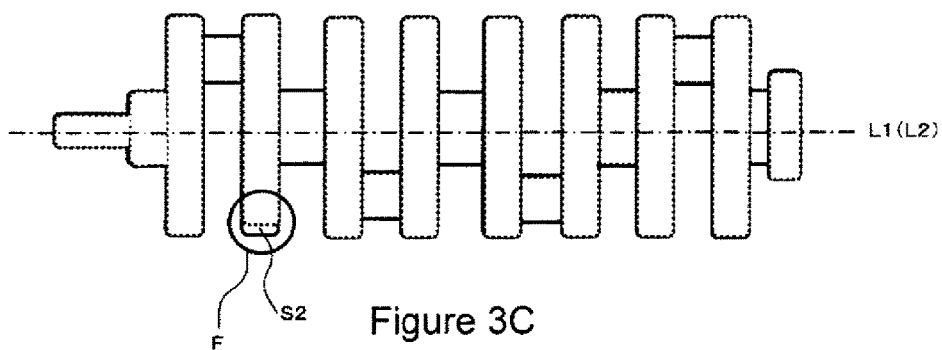
Figure 4A:
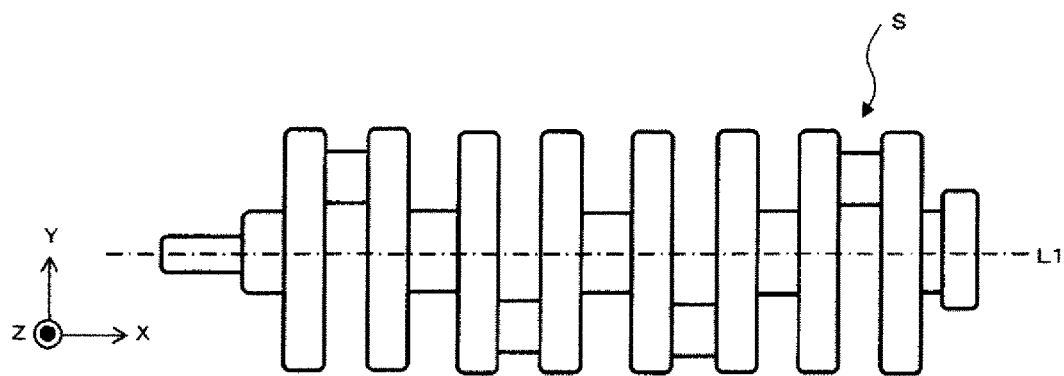
FIG. 4 is a schematic diagram to explain a situation in which three-dimensional point cloud data is superposed on a surface shape model without being divided, for a crankshaft having bending.
Figure 4B:
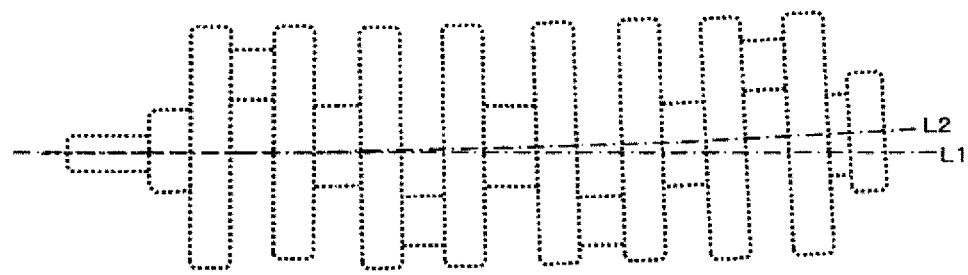
Figure 4C:
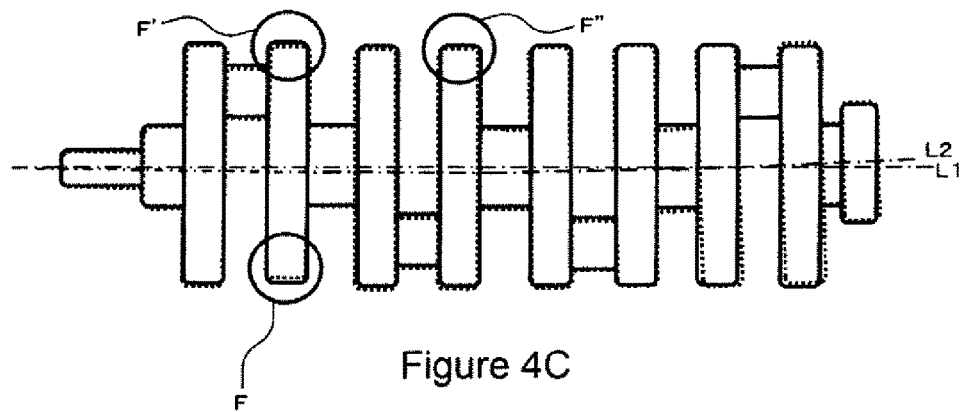
Figure 5A:
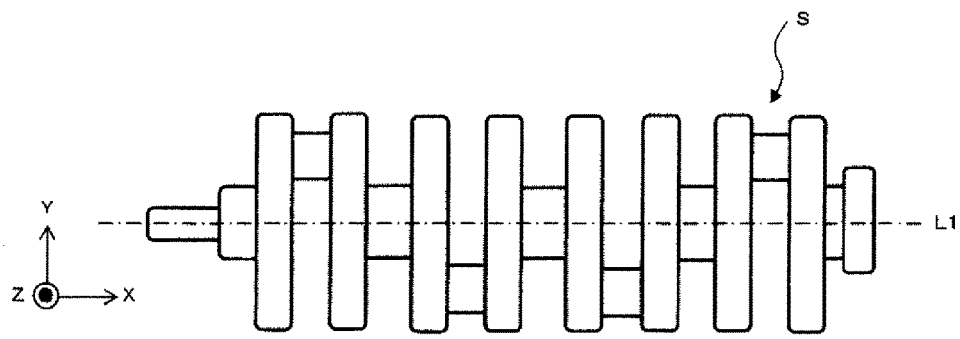
FIG. 5 is a schematic diagram to explain a situation in which divided subregion three-dimensional point cloud data is superposed on a surface shape model by using an inspection method according to the present invention for a crankshaft having bending.
Figure 5B:
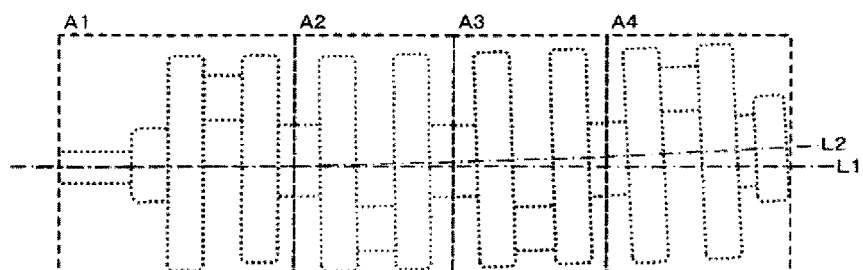
Figure 5C:
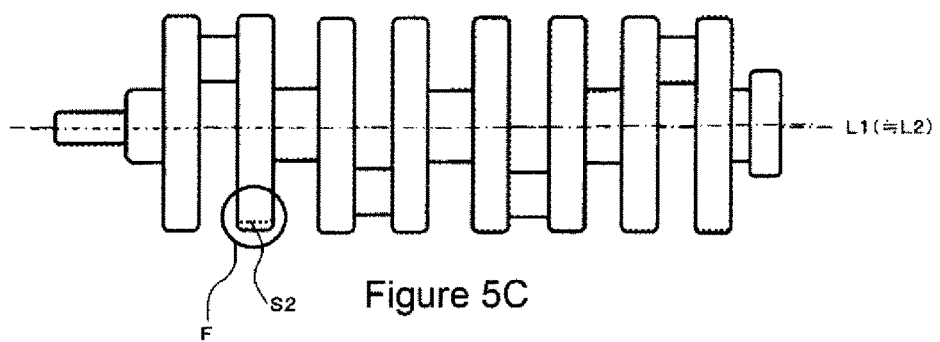

FIG. 3 is a schematic diagram to explain a situation in which three-dimensional point cloud data without being divided is superposed on a surface shape model, for a crankshaft S having neither bending nor torsion. FIG. 4 is a schematic diagram to explain a situation in which three-dimensional point cloud data without being divided is superposed on a surface shape model, for a crankshaft S having bending. FIG. 5 is a schematic diagram to explain a situation in which divided subregion three-dimensional point cloud data is superposed on a surface shape model by using an inspection method according to the present embodiment, for a crankshaft S having bending. FIGS. 3A, 4A and 5A each show a surface shape model. FIGS. 3B, 4B and 5B each show three-dimensional point cloud data. FIGS. 3C, 4C and 5C each show a result of superposing by translating and rotating three-dimensional point cloud data such that a distance between the three-dimensional point cloud data and the surface shape model becomes minimum.

As shown in FIG. 3, if the crankshaft S has neither bending nor torsion, it is possible to detect a part (encircled part F in FIG. 3C) in which a partial defect such as an underfill and a dent flaw has occurred, even if the three-dimensional point cloud data without being divided is superposed on the surface shape model.

However, as shown in FIG. 4, if the crankshaft S has bending, deviation between the rotational center axis L1 of the surface shape model and the center axis L2 of the three-dimensional point cloud data is large. Thus, even if the three-dimensional point cloud data is translated and rotated to be superposed such that the distance between the three-dimensional point cloud data and the surface shape model becomes minimum, a non-superposed part (for example, encircled parts F', F'' in FIG. 4C) will occur in addition to the part of a partial defect such as an underfill and a dent flaw (an encircled part F in FIG. 4C). For this reason, even if it is possible to detect that there is a certain type of shape failure, it is not possible to discriminate whether a defect which occurs partially in the crankshaft S such as an underfill and a dent flaw, or, bending or torsion over the entire length of the crankshaft. Further, it is not possible to quantify a size of the defect.

In contrast, as shown in FIG. 5, even if the crankshaft S has bending, according to an inspection method of the present embodiment, the three-dimensional point cloud data is divided to create a plurality of subregion three-dimensional point cloud data each of which respectively corresponding to each of a plurality of subregions of the crankshaft (four subregions A1 to A4 in an example shown in FIG. 5), each of the subregion three-dimensional data group is translated and rotated to be superposed on the surface shape model. Thus, deviation decreases between the rotational center axis L1 of the surface shape model and the rotational center axis L2 consisting of each rotational center axis of the subregion three-dimensional data group, and influences of bending will be reduced. For this reason, it is possible to accurately detect a part (encircled part F in FIG. 5C) in which a partial defect such as an underfill and a dent flaw has occurred.

Hereinafter, a method of determining a subregion in the third step of the inspection method according to the present embodiment will be described.

Figures 6A, 6B:
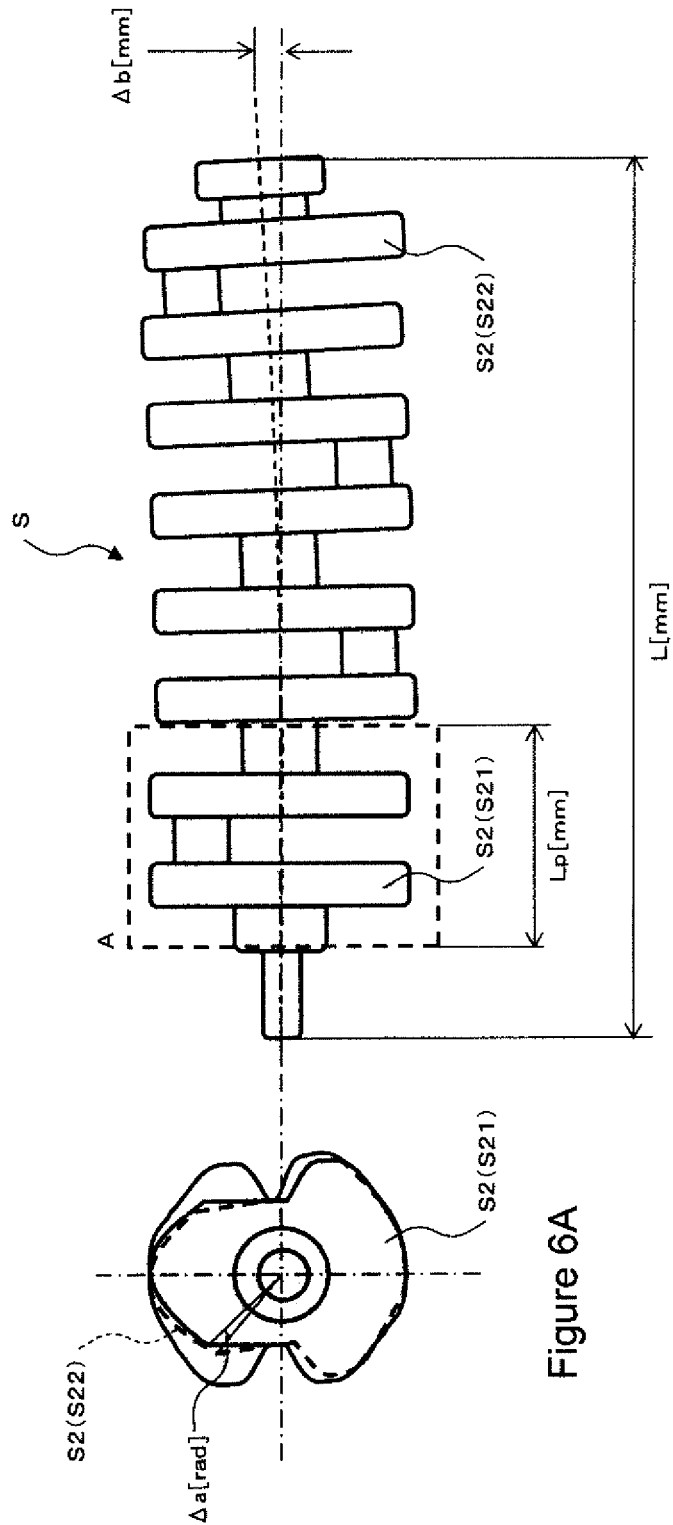
FIG. 6 is an explanatory diagram to illustrate one example of the method of determining a subregion in the third step of an inspection method according to the present invention.

FIG. 6 is an explanatory diagram to illustrate an example of the method of determining a subregion. As shown in FIG. 6, an entire length in a design specification of a crankshaft S (the entire length with no bending) is L [mm], a maximum radius in the design specification of the crankshaft S is R [mm] (not shown), an assumed torsion angle over the entire length of the crankshaft S is $\Delta a$ [rad], and an assumed bending over the entire length of the crankshaft S is $\Delta b$ [mm].

Here, the maximum radius R in the design specification of the crankshaft S means a distance from the rotational center axis of the crankshaft S to the surface of the crankshaft S (specifically, the surface of the arm S2) in which the distance becomes maximum in CAD data based on the design specification. Moreover, the torsion angle $\Delta a$ means an angle by which an arm S22 provided on one end side of the crankshaft S is rotated with respect to the arm S22 in CAD data when the arm S21 provided on the other end side of the crankshaft S is aligned to the arm S21 of the CAD data based on the design specification. Further, the bending $\Delta b$ means a distance by which one end of the crankshaft S is displaced in a direction perpendicular to the rotational center axis with respect to one end of the CAD data when the other end of the crankshaft S is aligned to the other end of CAD data based on the design specification.

In the above-described case, bending per size Lp [mm] can be assumed to be $\Delta b \cdot Lp/L$ [mm]. Moreover, torsion per size Lp [mm] can be assumed to be $\Delta a \cdot R \cdot Lp/L$ [mm]. For this reason, it is considered that satisfying the following Formula (2) enables detection of a partial defect such as an underfill at a detection accuracy of $\pm \Delta e$ [mm].

$$\Delta b \cdot Lp/L + \Delta a \cdot R \cdot Lp/L \leq 2 \cdot \Delta e \quad (2)$$

Modifying Formula (2) described above will result in Formula (1) described below.

$$Lp \leq 2L \cdot \Delta e/(\Delta b + \Delta a \cdot R) \quad (1)$$

Determining a size Lp (size in a direction parallel to the rotational center axis of the crankshaft S) of a subregion A to be divided so as to satisfy Formula (1) makes it possible to detect a partial defect such as an underfill at a detection accuracy of $\pm \Delta e$ [mm].

For example, in case where the crankshaft S is one for an inline-four engine, when the entire length L=450 mm in the design specification of the crankshaft S, an assumed bending $\Delta b$ [mm]=1 mm over the entire length of the crankshaft S, and an assumed torsion angle $\Delta a$=0 [rad] over the entire length of the crankshaft S, in order to detect an underfill and a dent flaw at a detection accuracy $\Delta e$=0.2 mm, it is required that the size Lp of the subregion is to be 180 mm or less since the right hand side of Formula (1) will be 180 mm (=2×450×0.2/1).

For example, if the spacing between adjacent journals is 100 mm, determining a subregion such that both ends of the subregion are located at adjacent journals will satisfy Formula (1) described above, and can reduce the influences of bending and torsion. Besides, it is considered that the subregion is determined such that both ends of the subregion are located at adjacent pins, or a journal and a pin which are adjacent to each other.

Hereinafter, a defect detecting method in the fifth step of an inspection method according to the present embodiment will be specifically described.

In the fifth step, the control computing device 2 creates a two-dimensional gradation image in which a pixel constituting the two-dimensional gradation image has a density corresponding to a distance between each of the subregion three-dimensional point cloud data after being superposed in the fourth step and the surface shape model. The two-dimensional gradation image is a projection of the subregion three-dimensional point cloud data after being superposed in the fourth step to a plane (XY plane) perpendicular to a facing direction (Z direction) between the three-dimensional shape measurement device 1 and the crankshaft S. Then, the control computing device 2 detects a partial defect such as an underfill of the crankshaft S based on a feature quantity obtained by subjecting the created two-dimensional gradation image to predetermined image processing.

According to the above-described defect detection method, for example, it is possible to extract a pixel region (pixel region corresponding to a large distance to the surface shape model) having a density higher than a predetermined threshold, and it is possible to automatically and easily detect a partial defect such as an underfill by using a feature quantity calculated from an area and a density of the extracted pixel region.

It is noted that the control computing device 2 has a function of creating a two-dimensional image in which a pixel constituting the two-dimensional image has a density or a color corresponding to the distance between the subregion three-dimensional point cloud data after being superposed in the fourth step and the surface shape model, in which the two-dimensional image is a projection of the subregion three-dimensional point cloud data after being superposed in the fourth step to a plane (XY plane) perpendicular to the facing direction (Z direction) between the three-dimensional shape measurement device 1 and the crankshaft S. The control computing device 2 also has a function of displaying the two-dimensional image on a monitor.

It is possible to easily detect a pixel region corresponding to a large distance to the surface shape model, that is, a partial defect such as an underfill, by an operator visually recognizing the two-dimensional image.

Figure 7A:
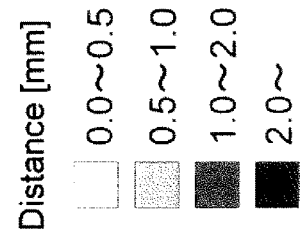
FIG. 7 is a diagram to show an example of two-dimensional image obtained when three-dimensional point cloud data is superposed, without being divided, on a surface shape model for a crankshaft having underfill and torsion.
Figure 7A:
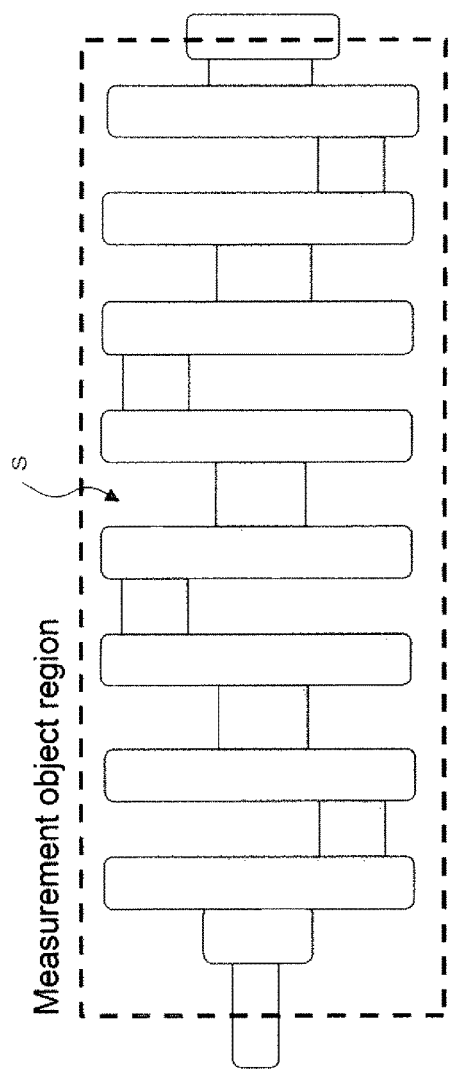

FIG. 7 is a diagram to show an example of a two-dimensional image (two-dimensional gradation image having a density corresponding to a distance) obtained by superposing three-dimensional point cloud data without being divided on a surface shape model for a crankshaft S for an inline-four engine having underfills and torsion. FIG. 8 is a diagram to show an example of a two-dimensional image (a two-dimensional gradation image having a density corresponding to a distance) obtained by superposing divided subregion three-dimensional point cloud data on a surface shape model by using an inspection method according to the present invention, for a crankshaft S having underfills and torsion same as the one of FIG. 7.

Figure 7B:
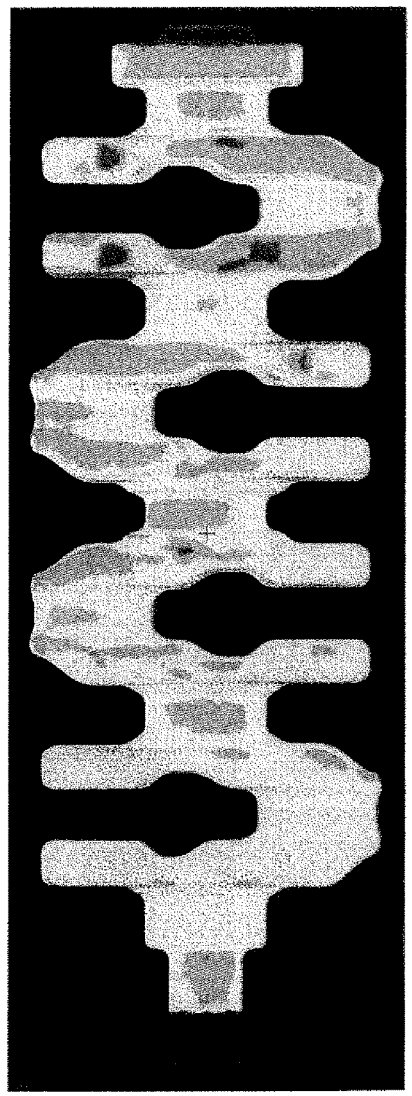
Figure 8A:
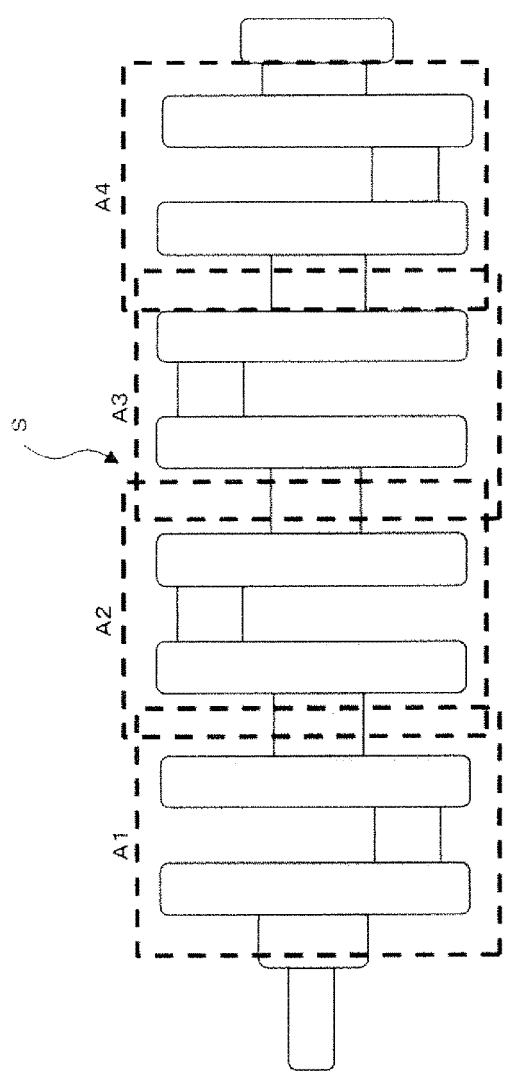
FIG. 8 is a diagram to show one example of two-dimensional image obtained when divided subregion three-dimensional point cloud data is superposed on a surface shape model by using an inspection method according to the present invention, for a crankshaft having underfill and torsion.

As shown in FIG. 7, it can be seen that in a two-dimensional image (FIG. 7B) obtained when three-dimensional point cloud data obtained on the measurement object region (FIG. 7A) is not divided and is superposed on the surface shape model, a distance of 0.5 mm or more has occurred over a wide range due to influences of torsion even in a portion without underfills.

Figure 8B:
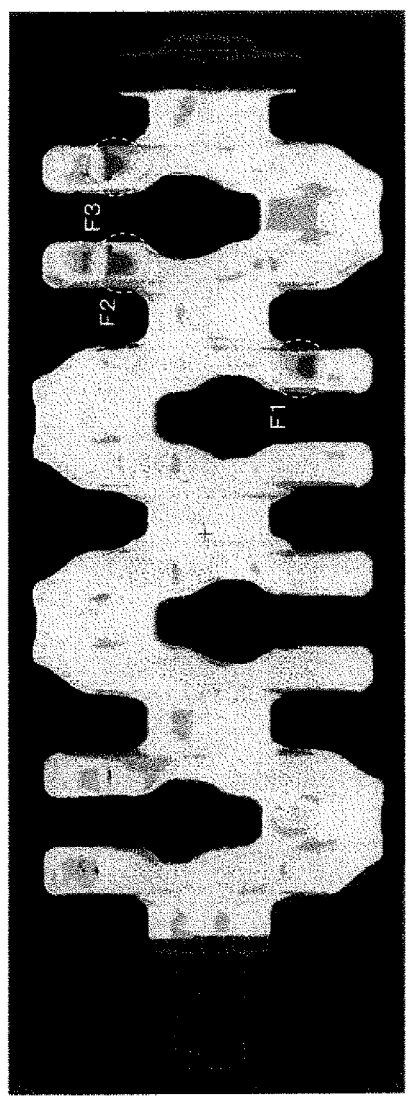

In contrast, as shown in FIG. 8, it is possible to visually and clearly recognize three underfills (encircled parts F1 to F3) having a distance of 1 mm or more in a two-dimensional image (FIG. 8B) obtained when three-dimensional point cloud data obtained on a measurement object region of 350 mm excluding both ends of 50 mm of the entire length 450 mm of the crankshaft S is divided and superposed on the surface shape model such that each of subregions (A1 to A4) of a size Lp=100 mm corresponds to each of the subregion point cloud data and such that both ends of the subregion are located at adjacent journals (divided such that the adjacent subregions have an overlapped portion). One part (encircled part F1) among three parts F1 to F3 cannot be visually and clearly recognized in the two-dimensional image shown in FIG. 7.

In FIGS. 7 and 8, although description has been made taking a two-dimensional image to be subjected to visual recognition by an operator as an example, it is also possible to automatically and easily detect a partial defect such as an underfill by subjecting this two-dimensional image to image processing.

It is noted that if a translating distance and a rotational angle when the subregion three-dimensional point cloud data is translated and rotated in the superposition in the fourth step are stored in the control computing device 2, it is possible to evaluate bending and torsion of the crankshaft S based on the translating distance and the rotational angle.

Figure 9:
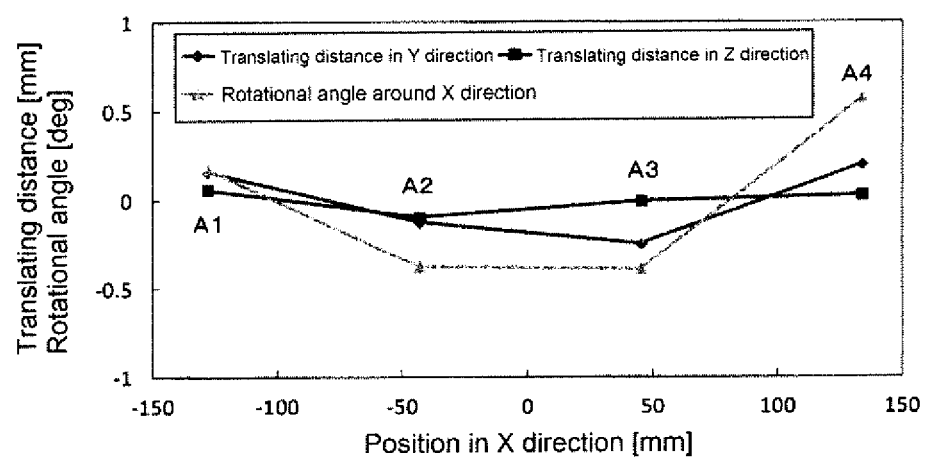
FIG. 9 is an explanatory diagram to illustrate an example of translating distance and rotational angle when subregion three-dimensional point cloud data is translated and rotated by using an inspection method according to the present invention, for a crankshaft having underfill and torsion.

FIG. 9 shows a translating distance and a rotational angle when the subregion three-dimensional point cloud data are translated and rotated, for a crankshaft S having underfills and torsion same as those in FIGS. 7 and 8, in which each of the divided subregion three-dimensional point cloud data corresponds to each of subregions (A1 to A4).

As shown in FIG. 9, since the translating distance in the Y and Z directions, that is, the translating distance in a direction perpendicular to the rotational center axis L of the crankshaft S is about 0 mm for any subregion, it can be evaluated that the crankshaft S has no bending. On the other hand, since the rotational angle around the X direction varies in a range of −0.3° to 0.7°, it can be evaluated that the crankshaft S has torsion for each subregion (for each cylinder).

Second Embodiment

Figure 10B:
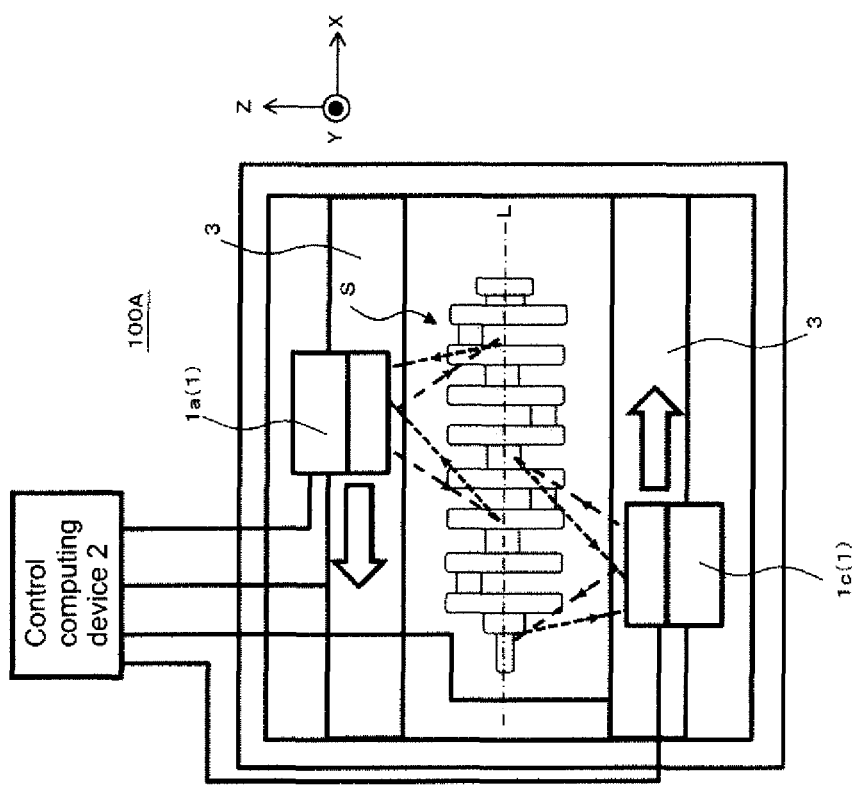
FIG. 10 is a diagram showing a schematic configuration of an inspection device of a crankshaft according to a second embodiment of the present invention.
Figure 10A:
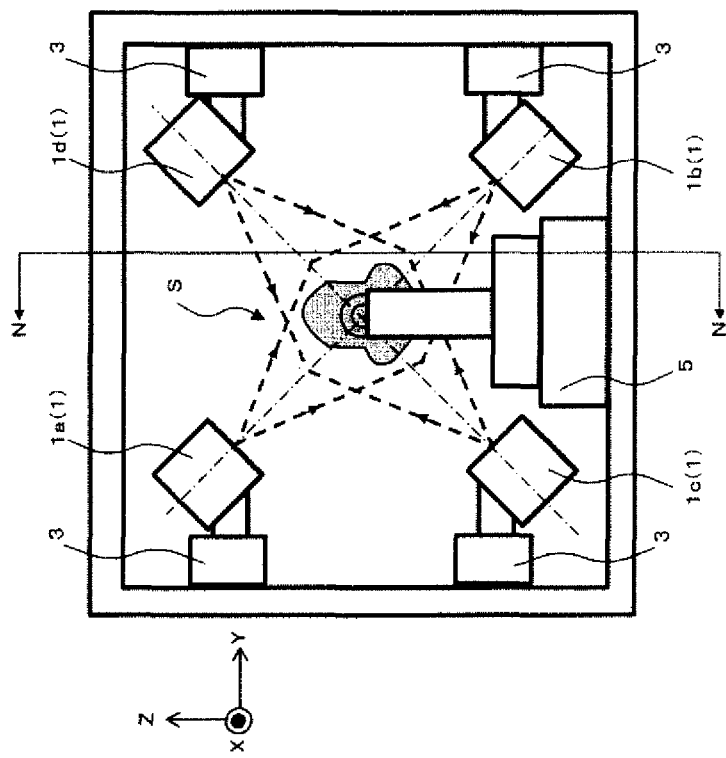

FIG. 10 is a diagram showing a schematic configuration of an inspection device according to a second embodiment of the present invention. FIG. 10A is a front view of the crankshaft S viewed from a direction of the rotational center axis L. FIG. 10B is a cross sectional view taken along NN line of FIG. 10A. In FIG. 10A, the control computing device 2 is omitted from illustration. In FIG. 10B, a support mechanism 5 is omitted from illustration.

As shown in FIG. 10, an inspection device 100A according to the present embodiment, as well as the inspection device 100 according to the first embodiment, includes an optical three-dimensional shape measurement device 1, a control computing device 2, and a moving mechanism 3. In the case of performing inspection by using the inspection device 100A according to the present embodiment as well, it is similar to the first embodiment in that the first to fifth steps are performed.

However, the inspection device 100A according to the present embodiment is different from the first embodiment in that the inspection device 100A does not include a rotating device 4, and instead includes a supporting mechanism 5 that chucks and fixes ends of the crankshaft S (the supporting mechanism 5 has no rotating function). Moreover, the inspection device 100A according to the present embodiment is different from that of the first embodiment in that four three-dimensional shape measurement devices 1 (1*a* to 1*d*) are disposed at a pitch of 90° around the rotational center axis L of the crankshaft S. Further, it is also different from the first embodiment in that the moving mechanism 3 includes four single-axis stages so as to be able to separately move the four three-dimensional shape measurement devices 1 in a direction (X direction) parallel to the rotational center axis L of the crankshaft S.

The control computing device 2 of the inspection device 100A according to the present embodiment can independently control timing of measuring a surface shape of a crankshaft S by the four three-dimensional shape measurement devices 1, and timing of moving the four three-dimensional shape measurement devices 1 by the moving mechanism 3.

As described so far, the inspection device 100A according to the present embodiment is capable of measuring the shape of the entire length and the entire circumference of a measurement object region of the crankshaft S without relatively rotating the crankshaft S in circumferential direction (hence, the rotating device 4 is unnecessary as described above) and thus can reduce measurement time, since the four three-dimensional shape measurement devices 1 are disposed at a pitch of 90° around the rotational center axis L of the crankshaft S.

Further, the moving mechanism 3 can separately move the four three-dimensional shape measurement devices 1 in the X direction, and the control computing device 2 can separately control the timing of measuring the surface shape of the crankshaft S by the four three-dimensional shape measurement devices 1, and the timing of moving the four three-dimensional shape measurement devices 1 by the moving mechanism 3. For this reason, it is possible to perform positional control of the three-dimensional shape measurement devices 1 and the timing control of measurement and movement of the three-dimensional shape measurement devices 1, which can avoid a situation in which projected light of any of the three-dimensional shape measurement devices 1 enters into a measurement field of view of another three-dimensional shape measurement devices 1 different from the concerned three-dimensional shape measurement device 1, disabling the another three-dimensional shape measurement devices 1 to perform measurement.

Specifically, the control computing device 2 of the present embodiment controls the operation of the moving mechanism 3 and the four three-dimensional shape measurement devices 1 such that while any one pair of three-dimensional shape measurement devices (for example, three-dimensional shape measurement devices 1a, 1b) disposed in a direction opposite to each other among the four three-dimensional shape measurement devices 1, are measuring the surface shape of the crankshaft S, any other pair of three-dimensional shape measurement devices (for example, three-dimensional shape measurement devices 1c, 1d) disposed in a direction opposite to each other are moved without performing measurement, and such that projected light of one three-dimensional shape measurement device (for example, three-dimensional shape measurement device 1a) constituting the pair of three-dimensional shape measurement devices 1a, 1b measuring the surface shape of the crankshaft S does not enter a measurement field of view of the other three-dimensional shape measurement device (for example, three-dimensional shape measurement device 1b).

As described above, while any one pair of three-dimensional shape measurement devices 1 disposed in a direction opposite to each other are measuring the surface shape of the crankshaft S, any other pair of three-dimensional shape measurement devices 1 disposed in a direction opposite to each other will move without performing measurement. For this reason, projected light from the one pair of three-dimensional shape measurement devices 1 which are measuring the surface shape of the crankshaft S will have no influence on the other pair of three-dimensional shape measurement devices 1 which are moving without performing measurement. Moreover, since control is performed such that projected light of one three-dimensional shape measurement device 1 constituting the pair of three-dimensional shape measurement devices 1, which are measuring the surface shape, does not enter the measurement field of view of the other three-dimensional shape measurement device 1, it is possible to avoid a situation in which the other three-dimensional shape measurement device 1 becomes unable to perform measurement.

FIG. 11 shows an example of evaluation results of the surface-shape measurement time of a crankshaft S (time required for shape measurement of the entire length and the entire circumference of measurement object region) by an inspection device 100A according to the present embodiment.

In evaluating the measurement time, it was assumed that the surface shape of the entire length of the measurement object region excepting both ends is measured in three measurement fields of view of P1 to P3 (measured for three times) in the X direction as shown in FIG. 11A, with the entire length of the crankshaft S being 600 mm, and the measurement field of view in the X direction of the three-dimensional shape measurement device 1 being 200 mm. It was assumed that the time required for measurement (measurement for one time) in one measurement field of view is 2 seconds, and the moving time by the moving mechanism 3 to the next measurement field of view is 2 seconds.

FIG. 11B is an example of the timing control of measurement and movement which can be executed by the inspection device 100A according to the present embodiment. As shown in FIG. 11B, while one pair of three-dimensional shape measurement devices 1a, 1b disposed in a direction opposite to each other are measuring the surface shape in any measurement field of view of the crankshaft S, the other pair of three-dimensional shape measurement devices 1c, 1d disposed in a direction opposite to each other move without performing measurement. Conversely, while the other pair of three-dimensional shape measurement devices 1c, 1d are measuring the surface shape, the one pair of three-dimensional shape measurement devices 1a, 1b move without performing measurement. Then, the pair of three-dimensional shape measurement devices 1 measuring the surface shape are measuring the surface shape in a respectively different measurement field of view. For example, while the pair of three-dimensional shape measurement devices 1a, 1b measure the surface shape in an elapsed time of 2 seconds, the three-dimensional shape measurement device 1a is measuring the surface shape in a measurement field of view P1, and the three-dimensional shape measurement device 1b is measuring the surface shape in a measurement field of view P2. That is, the three-dimensional shape measurement device 1a and the three-dimensional shape measurement device 1b measure the surface shape at positions deviated from each other in the X direction parallel to the rotational center axis of the crankshaft S. As a result of this, projected light of one three-dimensional shape measurement device 1a or 1b will not enter the measurement field of view of the other three-dimensional shape measurement device 1b or 1a. The same is true when the pair of three-dimensional shape measurement devices 1c, 1d perform measurement.

According to the inspection device 100A of the present embodiment, since it is possible to perform shape measurement of the entire length and the entire circumference of the measurement object region substantially only by measurement time for 4 times and moving time for 2 times, the measurement time will be 2 seconds×4+2 seconds×2=12 seconds, thus allowing significant reduction of measurement time.

In contrast to this, in the case of the inspection device 100 according to the first embodiment, since it requires a measurement time for 3 times and a moving time for 2 times to perform shape measurement of the entire length of the measurement object region for a predetermined portion in the circumferential direction of the crankshaft S, the measurement time will be 2 seconds×3+2 seconds×2=10 seconds. To perform shape measurement of the entire circumference by rotating the crankshaft S at a pitch of 90°, it takes 10 seconds×4=40 seconds. Further, assuming that necessary time to rotate the crankshaft S by 90° is 2 seconds, since three rotations are required for shape measurement of the entire circumference, it further requires 2 seconds×3=6 seconds, and a total measuring time of 40 seconds+6 seconds=46 seconds will be required.

Moreover, when four three-dimensional shape measurement devices 1a to 1d cannot be moved separately (when the imaging field of view is the same for the X direction of four three-dimensional shape measurement devices 1a to 1d), since simultaneous measurement by the four three-dimensional shape measurement devices 1 is not possible, and measurement will be performed sequentially, it takes 2 seconds×4=8 seconds to perform shape measurement of the entire circumference of one measurement field of view. Since to perform shape measurement of the entire length of measurement object region, 3 times of shape measurement of the entire circumference of this one measurement field of view, and 2 times of movement are needed, it requires 8 seconds×3+2 seconds×2=28 seconds, which is longer time compared with the inspection device 100A according to the present embodiment.

REFERENCE SIGNS LIST

1 . . . Three-dimensional shape measurement device
2 . . . Control computing device
3 . . . Moving mechanism
4 . . . Rotating device
100 . . . Inspection device
S . . . Crankshaft

The invention claimed is:
1. A method for inspecting a crankshaft, comprising:
a first step of disposing an optical three-dimensional shape measurement device to face a crankshaft in a direction perpendicular to a rotational center axis of the crankshaft, wherein the three-dimensional shape measurement device is configured to measure a three-dimensional shape of a measurement object by projecting and receiving light to and from the measurement object;
a second step of measuring a surface shape of the crankshaft by the three-dimensional shape measurement device disposed in the first step to acquire three-dimensional point cloud data of a surface of the crankshaft over an entire length of a measurement object region of the crankshaft;
a third step of dividing the three-dimensional point cloud data acquired in the second step to create a plurality of subregion three-dimensional point cloud data, each of the subregion three-dimensional point cloud data respectively corresponding to each of a plurality of subregions of the crankshaft along a direction parallel to the rotational center axis of the crankshaft;
a fourth step of translating and rotating each of the subregion three-dimensional point cloud data created in the third step to superpose each of the subregion three-dimensional point cloud data on a surface shape model of the crankshaft prepared in advance based on a design specification of the crankshaft, such that a distance between each of the subregion three-dimensional point cloud data and the surface shape model becomes minimum; and a fifth step of calculating a distance between each of the subregion three-dimensional point cloud data after being superposed in the fourth step and the surface shape model, and detecting a partial defect such as an underfill of the crankshaft based on the distance calculated.

2. The method for inspecting a crankshaft according to claim 1, wherein
in the second step, measurement of the surface shape of the crankshaft by the three-dimensional shape measurement device and relative movement of the three-dimensional shape measurement device in a direction parallel to the rotational center axis of the crankshaft are alternately repeated.

3. The method for inspecting a crankshaft according to claim 1, further comprising
a sixth step of evaluating bending and torsion of the crankshaft based on a translating distance and a rotational angle when each of the subregion three-dimensional point cloud data is translated and rotated in the fourth step.

4. The method for inspecting a crankshaft according to claim 1, wherein
in the third step, when a defect detection accuracy required in the fifth step is ±Δe [mm], a size Lp [mm] of the subregion of the crankshaft, which is to be divided, in a direction parallel to the rotational center axis of the crankshaft is determined so as to satisfy the following Formula (1):

$$Lp \leq 2L \cdot \Delta e/(\Delta b + \Delta a \cdot R) \quad (1)$$

where, in the above Formula (1), L [mm] refers to an entire length in the design specification of the crankshaft; R [mm] refers to a maximum radius in the design specification of the crankshaft; Δa [rad] refers to an assumed torsion angle over the entire length of the crankshaft; and Δb [mm] refers to an assumed bending over the entire length of the crankshaft.

5. The method for inspecting a crankshaft according to claim 1, wherein
in the third step, the subregion of the crankshaft is determined such that both ends of the subregion, which is to be divided, in a direction parallel to the rotational center axis of the crankshaft are located at adjacent journals of the crankshaft, adjacent pins of the crankshaft, or a journal and a pin adjacent to each other of the crankshaft.

6. The method for inspecting a crankshaft according to claim 1, wherein
in the fifth step,
a two-dimensional gradation image is created, in which a pixel constituting the two-dimensional gradation image has a density corresponding to a distance between each of the subregion three-dimensional point cloud data after being superposed in the fourth step and the surface shape model, wherein the two-dimensional gradation image is a projection of each of the subregion three-dimensional point cloud data after being superposed in the fourth step to a plane perpendicular to a facing direction between the three-dimensional shape measurement device and the crankshaft, and
a partial defect of the crankshaft is detected based on a feature quantity obtained by subjecting the two-dimensional gradation image to predetermined image processing.

7. The method for inspecting a crankshaft according to claim 1, further comprising a seventh step of:

creating a two-dimensional image in which a pixel constituting the two-dimensional image has a density or a color corresponding to a distance between each of the subregion three-dimensional point cloud data after being superposed in the fourth step and the surface shape model, wherein the two-dimensional image is a projection of each of the subregion three-dimensional point cloud data after being superposed in the fourth step to a plane perpendicular to a facing direction between the three-dimensional shape measurement device and the crankshaft; and displaying the two-dimensional image.

8. A device for inspecting a crankshaft, comprising:

an optical three-dimensional shape measurement device which is disposed to face a crankshaft in a direction perpendicular to a rotational center axis of the crankshaft, and which is configured to measure a three-dimensional shape of a measurement object by projecting and receiving light to and from the measurement object; and a control computing device configured to control an operation of the three-dimensional shape measurement device and executing predetermined computing on a result measured by the three-dimensional shape measurement device, wherein:

a surface shape model of the crankshaft prepared based on a design specification of the crankshaft is stored in advance in the control computing device;

three-dimensional point cloud data of a surface of the crankshaft over the entire length of a measurement object region of the crankshaft acquired by the three-dimensional shape measurement device measuring the surface shape of the crankshaft is input to the control computing device; and the control computing device is configured to execute steps of dividing the three-dimensional point cloud data which is input, to create a plurality of subregion three-dimensional point cloud data, each of the subregion three-dimensional point cloud data respectively corresponding to each of a plurality of subregions of the crankshaft along a direction parallel to the rotational center axis of the crankshaft;

translating and rotating each of the subregion three-dimensional point cloud data to superpose each of the subregion three-dimensional point cloud data on the surface shape model such that a distance between each of the subregion three-dimensional point cloud data created and the surface shape model stored becomes minimum; and calculating a distance between each of the subregion three-dimensional point cloud data after being superposed and the surface shape model, and detecting a partial defect such as an underfill of the crankshaft based on the distance calculated.

9. The device for inspecting a crankshaft according to claim 8, further comprising a moving mechanism whose operation is controlled by the control computing device and which is configured to relatively move the three-dimensional shape measurement device in a direction parallel to the rotational center axis of the crankshaft, wherein the control computing device is configured to control the operation of the three-dimensional shape measurement device and the moving mechanism such that measurement of the surface shape of the crankshaft by the three-dimensional shape measurement device, and relative movement of the three-dimensional shape measurement device in a direction parallel to the rotational center axis of the crankshaft by the moving mechanism are alternately repeated.

10. The device for inspecting a crankshaft according to claim 8, wherein the three-dimensional shape measurement device is a three-dimensional shape measurement device of a pattern projection type.

11. The device for inspecting a crankshaft according to claim 8, comprising four three-dimensional shape measurement devices disposed at a pitch of 90° around the rotational center axis of the crankshaft, wherein:

the moving mechanism can separately move the four three-dimensional shape measurement devices in a direction parallel to the rotational center axis of the crankshaft; and the control computing device can separately control timing of measuring the surface shape of the crankshaft by the four three-dimensional shape measurement devices and timing of moving the four three-dimensional shape measurement devices by the moving mechanism.

12. The device for inspecting a crankshaft according to claim 11, wherein the control computing device is configured to control the operation of the moving mechanism and the four three-dimensional shape measurement devices such that while any one pair of three-dimensional shape measurement devices disposed in a direction opposite to each other among the four three-dimensional shape measurement devices are measuring the surface shape of the crankshaft, any other pair of three-dimensional shape measurement devices disposed in a direction opposite to each other are moved without performing measurement, and such that projected light of one three-dimensional shape measurement device constituting the pair of three-dimensional shape measurement devices measuring the surface shape of the crankshaft does not enter a measurement field of view of the other three-dimensional shape measurement device.

* * * * *